United States Patent
Panchyshyn

(10) Patent No.: US 6,346,318 B1
(45) Date of Patent: Feb. 12, 2002

(54) METALLIZED COLORED TRANSPARENT LAMINATING FILM

(75) Inventor: Maurice Panchyshyn, Hudson (CA)

(73) Assignee: M & R Plastics Inc., Quebec (CA)

( * ) Notice: Subject to any disclaimer, the term of this patent is extended or adjusted under 35 U.S.C. 154(b) by 0 days.

(21) Appl. No.: 09/420,287

(22) Filed: Oct. 18, 1999

(51) Int. Cl.[7] ............................. B32B 7/02; B32B 3/00
(52) U.S. Cl. ................. 428/212; 428/195; 428/480; 428/500; 428/650; 428/658; 428/34.7; 428/35.3; 428/35.9; 428/457
(58) Field of Search .................. 428/212, 480, 428/500, 650, 658, 34.7, 35.3, 35.9, 457, 195

(56) References Cited

U.S. PATENT DOCUMENTS

| | | |
|---|---|---|
| 4,211,822 A | 7/1980 | Kurfman et al. |
| 4,308,084 A | 12/1981 | Ohtunsuki et al. |
| 4,360,551 A | 11/1982 | Guarino et al. |
| 4,528,234 A | 7/1985 | Kaiho et al. |
| 4,559,266 A | 12/1985 | Misasa et al. |
| 4,825,025 A | 4/1989 | Seiferth |
| 4,936,935 A | 6/1990 | Beckett |
| 5,106,670 A | 4/1992 | Wyslotsky et al. |
| 5,164,245 A * | 11/1992 | Suzuki ....................... 428/201 |
| 5,834,046 A | 11/1998 | Turpin et al. |

* cited by examiner

Primary Examiner—Cynthia H. Kelly
Assistant Examiner—Ling Xu
(74) Attorney, Agent, or Firm—Pitney, Hardin, Kipp & Szuch LLP

(57) ABSTRACT

A multilayer laminate is disclosed. The base layer is a transparent colored layer made of OPS, PET, polypropylene, polyester, or a similar material. The base layer is then metallized by a vacuum process to provide a metallized sheet or film. A second sheet or film is then laminated over the metallized layer. The laminating sheet or film is transparent and may be either clear or have a desired color so that a metallized color is seen on both sides of the sheet. If a colored laminated layer is selected then a different color is seen on each side of the sheet. The sheet may then be converted into a thermoformed tray. The use of a colored laminating sheet provides colors such as gold and metallized blue previously not available at reasonable costs.

15 Claims, 1 Drawing Sheet

METALLIZED COLORED TRANSPARENT LAMINATING FILM

BACKGROUND OF THE INVENTION

1. Field of the Invention

Figure 1:
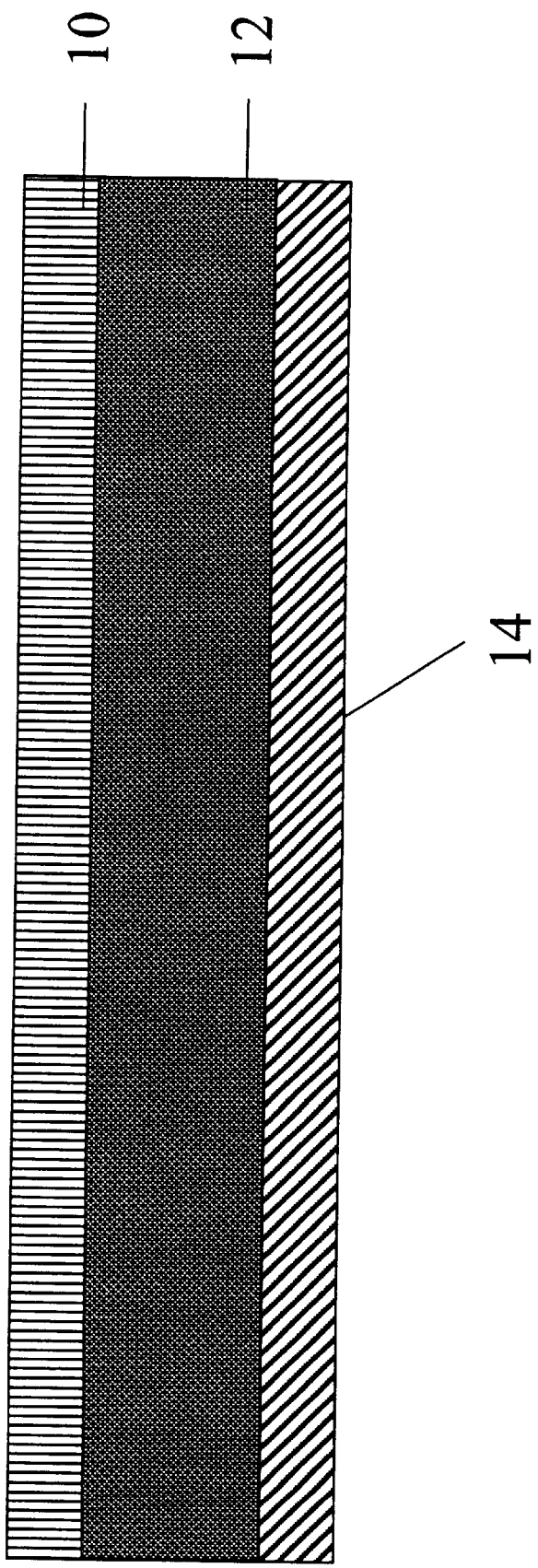

This invention relates to a metallized colored transparent thermoplastic laminated film for use alone or in thermoformed trays.

2. Brief Description of Related Art

Metallized sheet or films for thermoformed trays consisting of a layer of thermoplastic sheet or film that has been metallized by a vacuum process to provide a metallized sheet or film is well-known. Metallized plastic articles may be prepared by applying a metal to a plastic material by vacuum deposition, electrolytic deposition, foil lamination or similar metallizing techniques. Such articles are widely employed for decorative purposes, particularly the metallized films which are quite flexible and can be shaped to some extent to conform to various contours.

U.S. Pat. No. 4,528,234 describes a transparent laminate. The laminate has a transparent plastic resin film or sheet substrate that has a thin metal layer formed on one side. A carboxyle group containing polyolefin layer is formed on the metal layer by lamination.

U.S. Pat. No. 4,825,025 describes a food receptacle for microwave cooking. The receptacle generally has three layers. The uppermost layer is a high heat tolerant protective layer, which ensures that the food product does not touch the metal layer or the substrate. Underneath the uppermost layer is a thin layer of a conductive material. These two layers are mounted on a substrate, preferably paper.

U.S. Pat. No. 5,106,670 describes a metallized package component. The component includes at least two layers of a thermoplastic polymeric laminate, which may be bonded together by an adhesive. A metallic layer is disposed on the top surface of the laminate and is visible from both sides of the laminate.

U.S. Pat. No. 4,360,551 describes a flexible film laminate. The laminate has a first layer of a heat-sealable polyolefin, a second layer of a previously metallized thermoplastic polymer that is bonded to the first layer, and an adhesive for bonding the metallized surface of the second layer to the first layer.

U.S. Pat. No. 4,308,084 describes a laminate for packaging foodstuffs. The laminate has an aluminum substrate. The substrate is laminated to a polyolefin film using a polyolefin resin as an adhesive.

U.S. Pat. No. 4,211,822 describes highly reflective multilayer metal and polymer composites. The composite has a thermoplastic polymer outer layer, one side of which is intimately bonded with a layer of a soft metal. The composite is then formed by a conventional forming process to the desired shape.

U.S. Pat. No. 4,936,935 describes a microwave heating material. A metal layer is bonded to a substrate layer, which is then overlaid with an outer lacquer layer. The substrate may be a polymer.

U.S. Pat. No. 5,834,046 describes a closure for microwave cooking. The bottom portion of the closure is a lamination. A moisture barrier polyolefin is laminated to a thermoformable substrate, which is typically a polyester.

However, metallized sheet or film has certain disadvantages and limitations. While the metallized layer is located on the bottom of the sheet and not in direct contact with the food product that will be packaged in a tray formed from this sheet, the top of sheet may nevertheless contain particles of metal due to these having rubbed off during the nesting of the trays. Such particles can contaminate the product package on the tray. Additionally, from time to time for different reasons moisture may come into contact with the metallized particles causing the color to change from a shiny bright look to a dirty rusty aspect.

U.S. Pat. No. 4,559,266 describes laminated materials for thermoforming into food packaging. The laminate has a layer of mainly polyolefin, a layer of a polymer, a metal-vacuum deposited layer and a layer of a transparent thermoplastic material.

However, the present metallized sheets provide a bright shiny look such as gold or silver on one side only rather than on both. Thus there is still a need to provide a metallized color effects (either of the same aspect or of different aspects) from both sides of the film.

SUMMARY OF THE INVENTION

It is therefore a principal object of the invention to overcome the shortcomings of the devices heretofore mentioned.

It is a further object to provide colored metallized film and trays.

It is a further object to provide film and trays with metallized colors.

It is a further object to provide film and trays having two sides each with different metallized colors.

It is an object to provide metallized film and trays which do not rub off metal particles upon contact.

It is a further object provide metallized film and trays which do not rust.

The invention is a multilayer laminate. To solve the above problems, a new thermoplastic sheet or film has been developed comprising a base layer of a transparent colored layer, made of styrenic films such as OPS (oriented polystyrene) polyester films such as PET (polyethylene terephthalate), polyolefin films such as polypropylene, polyethylene, PVCs (polyvinyl chlorides) or similar film materials. The base layer is then metallized by a vacuum process to provide a metallized sheet or film. A second thermoplastic sheet or film is then laminated over the metallized layer. The laminating sheet or film is transparent and may be either clear or have a desired color. If a colored laminated layer is selected then a different color is seen on each side of the sheet. The sheet may then be converted into a thermoformed tray.

Accordingly, by laminating a sheet or film (of any of the above indicated categories) over a previously metallized sheet or film, two of the existing problems presently encountered are solved, namely metal particles rubbing off on food and the rusting of the metal trays themselves. Furthermore, the invention provides the commercially desirable possibility of a new combination of metallized colors, heretofore not available at reasonable costs. Additionally, the new type of sheet may be converted into thermoformed trays in preferred embodiments of the invention.

DETAILED DESCRIPTION OF THE PREFERRED EMBODIMENTS OF THE INVENTION

Those skilled in the art will gain an appreciation of the invention from the following discussion of the preferred embodiments of the invention.

FIG. 1 shows a schematic of a preferred embodiment of the invention. The laminating sheet or film according to the present invention can be made by the following procedure.

A first transparent colored layer 10, made of OPS, PET, polypropylene, or a similar material is covered on one side with a metallized layer 12. Metallized layer 12 of the invention is a metal-vacuum deposited layer. Methods for forming a vacuum deposited or sputtering layer 12 of aluminum, tin, zinc and/or other metals on the surface of a plastic resin film substrate are known per se. That is the metal is vacuum deposited or sputtered in an inert gas such as argon on the substrate. Usually, aluminum is used to form layer 12.

A third layer 14 is then laminated over the metallized layer. The laminating sheet or film 14 is preferably transparent and may be either clear or have a desired color. If a colored laminated layer is selected then a different color is seen on each side of the sheet. There is no limitation on the layer 14 as used herein so long as it is transparent or translucent enough to show the metallized layer underneath.

The laminate of the invention possesses a decorative effect due to the metallized layer's 12 luster which is seen through layers 10 and 14. The invention provides the possibility of a combination of numerous metallized colors. For example, if one wanted a gold appearance on one side, and a silver appearance on the other side, there could be a combination of an amber transparent layer with aluminum sputtered on to the layer with a clear layer laminated over the metallized layer. The invention provides the benefit of a film with two different metallized colors appearing from either side.

Additional effects are added when layer 14 is colored so that there is a colored decorative effect on both sides. An important feature of the tray is that the metal layer should be of sufficient thickness to provide a metallized appearance through the transparent colored layer and so that two different colored views may be obtained when looking at either side of the laminate rather than a mixing of colors.

In alternative embodiments, layers 10 and/or 14 may comprise a translucent or iridescent material for alternate aesthetic effects.

The laminated material of the invention is useful as a packaging material or may be used for thermoformed trays. Methods of manufacturing thermoformed trays are well known to those skilled in the art.

Thus by the present invention its advantages will be realized and although preferred embodiments have been disclosed and described in detail herein, its scope should not be limited thereby rather its scope should be determined by that of the appended claims.

What is claimed is:

1. A laminating film having two sides comprising:
    a) a first transparent colored film or sheet;
    b) a metallized layer bonded to said first transparent colored film or sheet;
    c) a second transparent film or sheet laminated over said metallized layer,
wherein said second transparent film or sheet is colored, tinted, or clear, and wherein said metallized layer is of sufficient thickness to provide a metallic aspect visible from both sides of said laminating film.

2. A laminating film as in claim 1 wherein the color of the second transparent layer is amber.

3. A laminating film as in claim 1 wherein the metallized layer comprises aluminum and the first and second transparent films are colored amber to provide a gold aspect from both sides of the film.

4. A laminating film as in claim 1 wherein the metallized layer comprises aluminum, the first transparent film is colored amber to provide a gold aspect from one side of the film and the second transparent film is clear to provide a silver aspect from the other side of the film.

5. A laminating film as in claim 1 wherein the first transparent film is colored to provide a gold aspect from one side of the film and the second transparent film is colored to provide a metallized color aspect from the other side of the film.

6. A laminating film as in claim 1 wherein said metallized layer is added by a vacuum metallizing process.

7. A laminating film as in claim 1 wherein the first transparent film comprises a material from the group consisting of oriented polystyrene, polyethylene, polypropylene, and polyester.

8. A laminating film as in claim 1 wherein the first transparent film comprises a material from the group consisting of styrenic compounds, polyesters, polyolefins, and polyvinyl chlorides.

9. A laminating film as in claim 1 wherein said metallized layer comprises a material from the group consisting of aluminum, tin, and zinc.

10. A laminating film as in claim 1 wherein the first transparent film consists of a material from the group consisting of oriented polystyrene, polyethylene, polypropylene, and polyester.

11. A laminating film as in claim 1 wherein the first transparent film consists of a material from the group consisting of styrenic compounds, polyesters, polyolefins, and polyvinyl chlorides.

12. A laminating film as in claim 1 wherein said metallized layer consists of a material from the group consisting of aluminum, tin, and zinc.

13. A tray thermoformed from the film of claim 1.

14. A laminating film having two sides comprising:
    a) a first transparent colored film or sheet;
    b) a metallized layer bonded to said first transparent colored film or sheet;
    c) a translucent film or sheet laminated over said metallized layer,
        wherein said metallized layer is of sufficient thickness to provide a metallic aspect visible from both sides of said laminated film.

15. A laminating film having two sides comprising:
    a) a first transparent colored film or sheet;
    b) a metallized layer bonded to said first transparent colored film or sheet;
    c) an iridescent film or sheet laminated over said metallized layer,
wherein said metallized layer is of sufficient thickness to provide a metallic aspect visible from both sides of said laminated film.

* * * * *